United States Patent
Nishimura et al.

(10) Patent No.: US 8,420,739 B2
(45) Date of Patent: Apr. 16, 2013

(54) FLUORINE-CONTAINING ELASTOMER COMPOSITION

(75) Inventors: Yosuke Nishimura, Settsu (JP); Shoji Fukuoka, Settsu (JP); Yasuko Takagahara, Settsu (JP); Masahiko Oka, Settsu (JP); Kazuyoshi Kawasaki, Settsu (JP); Mitsuru Kishine, Orangeburg, NY (US)

(73) Assignee: Daikin Industries, Ltd., Osaka (JP)

( * ) Notice: Subject to any disclaimer, the term of this patent is extended or adjusted under 35 U.S.C. 154(b) by 307 days.

(21) Appl. No.: 12/934,560

(22) PCT Filed: Mar. 17, 2009

(86) PCT No.: PCT/JP2009/055149
§ 371 (c)(1),
(2), (4) Date: Sep. 24, 2010

(87) PCT Pub. No.: WO2009/119381
PCT Pub. Date: Oct. 1, 2009

(65) Prior Publication Data
US 2011/0021690 A1   Jan. 27, 2011

(30) Foreign Application Priority Data
Mar. 27, 2008   (JP) ................................ 2008-084590

(51) Int. Cl.
*C08L 27/12* (2006.01)
*C08L 27/16* (2006.01)
*C08L 27/20* (2006.01)

(52) U.S. Cl.
USPC .......................................... 525/199; 525/191

(58) Field of Classification Search .................. 525/191, 525/199; 524/500, 515, 519, 520
See application file for complete search history.

(56) References Cited

U.S. PATENT DOCUMENTS

| 4,146,532 | A | 3/1979 | Kometani et al. | |
| 4,487,882 | A | 12/1984 | Ueta et al. | |
| 6,323,283 | B1 * | 11/2001 | Apostolo et al. | 525/199 |
| 6,870,018 | B1 | 3/2005 | Tokuno et al. | |
| 2003/0100680 | A1 * | 5/2003 | Oriani | 525/199 |
| 2005/0250922 | A1 | 11/2005 | Irie et al. | |
| 2006/0052548 | A1 * | 3/2006 | Nishimura et al. | 525/345 |
| 2008/0076873 | A1 * | 3/2008 | Ogata et al. | 525/55 |

FOREIGN PATENT DOCUMENTS

| EP | 1832608 A2 | 9/2007 |
| EP | 2039706 A1 | 3/2009 |
| JP | 59-068363 A | 4/1984 |
| JP | 10-025447 A | 1/1998 |
| JP | 2002-525401 A | 8/2002 |
| JP | 2007-056215 A | 3/2007 |
| WO | 01/34666 A1 | 5/2001 |
| WO | 2004009647 A1 | 1/2004 |
| WO | 2008001895 A1 | 1/2008 |

* cited by examiner

*Primary Examiner* — Irina S Zemel
*Assistant Examiner* — Jeffrey Lenihan
(74) *Attorney, Agent, or Firm* — Sughrue Mion, PLLC

(57) ABSTRACT

There is provided a fluorine-containing elastomer composition assuring easy kneading and providing a crosslinked article having improved strength. The fluorine-containing elastomer composition comprises (A) an elastomer of a vinylidene fluoride/hexafluoropropylene copolymer having a branching coefficient of 30 to 300 ppm, a Mooney viscosity ($ML_{1+10}$: 121° C.) of 7 to 80 and a molecular weight distribution (Mw/Mn) of 1.5 to 4, and (B) an elastomer of a vinylidene fluoride/hexafluoropropylene copolymer having a storage modulus G' at 180° C. at 500 cpm of 500 to 900, and a mass ratio of (A)/(B) is 70/30 to 90/10.

7 Claims, No Drawings

FLUORINE-CONTAINING ELASTOMER COMPOSITION

TECHNICAL FIELD

The present invention relates to a fluorine-containing elastomer composition assuring easy kneading and providing a crosslinked article having improved strength, a composition for crosslinking comprising the fluorine-containing elastomer composition, and further, a crosslinked article obtained by crosslinking the composition for crosslinking.

BACKGROUND ART

Fluorine-containing elastomers having excellent flowability and being usable for molding such as injection molding can be prepared, for example, by the polymerization methods of Patent Documents 1, 2 and 3. These fluorine-containing elastomers have relatively sharp molecular weight distribution (Mw/Mn=1.8 to 3) and less branches.

On the other hand, when preparing a crosslinkable composition, shearing force is hardly applied in kneading other components, for example, a crosslinking agent and a filler, and therefore, in a short-time kneading, there is a case of causing a lack of strength.

Patent Document 1: WO 01/034666
Patent Document 2: WO 2004/009647
Patent Document 3: Examples 4 and 5 of WO 2008/001895

DISCLOSURE OF INVENTION

Problem to be Solved by the Invention

It is an object of the present invention to provide a fluorine-containing elastomer composition assuring easy kneading and providing a crosslinked article having improved strength.

Means to Solve the Problem

Namely, the present invention relates to a fluorine-containing elastomer composition comprising:
(A) an elastomer of a vinylidene fluoride/hexafluoropropylene copolymer having a branching coefficient of 30 to 300 ppm, a Mooney viscosity ($ML_{1+10}$: 121° C.) of 7 to 80 and a molecular weight distribution (Mw/Mn) of 1.5 to 4, and
(B) an elastomer of a vinylidene fluoride/hexafluoropropylene copolymer having a storage modulus G' at 180° C. at 500 cpm of 500 to 900,
in which a mass ratio of (A)/(B) is 70/30 to 90/10.

It is preferable that a Mooney viscosity ($ML_{1+10}$: 121° C.) of the composition is from 10 to 100, from the viewpoint of keeping of processability.

It is preferable that the elastomer (A) has an acid value of from 0.5 to 1.0 mgKOH/g, from the viewpoint of more improvement in strength.

It is preferable that the elastomer (A) is obtained by using isoparaffin as a chain transfer agent, from the viewpoint of more improvement in strength.

A filler may be blended to the fluorine-containing elastomer composition of the present invention.

The present invention also relates to a fluorine-containing elastomer composition for crosslinking comprising the fluorine-containing elastomer composition of the present invention and a crosslinking agent, and to a crosslinked article of a fluorine-containing elastomer obtained by subjecting the fluorine-containing elastomer composition for crosslinking to crosslinking.

Effect of the Invention

According to the fluorine-containing elastomer composition of the present invention, flowability can be maintained satisfactory, kneading with other components is easily carried out, and strength of the obtained crosslinked article can be improved.

BEST MODE FOR CARRYING OUT THE INVENTION

The fluorine-containing elastomer composition of the present invention comprises:
(A) an elastomer of a vinylidene fluoride (VdF)/hexafluoropropylene (HFP) copolymer having a branching coefficient of 30 to 300 ppm, a Mooney viscosity ($ML_{1+10}$: 121° C.) of 7 to 80 and a molecular weight distribution (Mw/Mn) of 1.5 to 4, and
(B) an elastomer of a VdF/HFP copolymer having a storage modulus G' at 180° C. at 500 cpm of 500 to 900,
in which a mass ratio of (A)/(B) is 70/30 to 90/10.

Each of the fluorine-containing elastomers (A) and (B) is explained below.

[1] Fluorine-Containing Elastomer (A)

The fluorine-containing elastomer (A) is a copolymer comprising VdF and HFP and has a specific branching coefficient, Mooney viscosity and molecular weight distribution.

(1) VdF/HFP Type Copolymer

In the case of a binary copolymer, a VdF/HFP copolymer, especially a binary copolymer comprising VdF and HFP in a molar ratio of 9/1 to 5/5, further 8.5/1.5 to 6/4 is preferred since elastomeric property is not impaired.

(2) Branching Coefficient

A "VdF branching coefficient" is calculated from the following equation by using an acetone solution of a polymer (concentration of about 30%) according to high resolution $^{19}F$-NMR.

$$\frac{\text{Area between } \delta F - 96.5 \text{ and } -99.5 \text{ ppm}}{3 \times (\text{Area between } \delta F - 88.0 \text{ and } -124.0 \text{ ppm})}$$

The branching defined above mainly represents an area of $CF_2$ group adjacent to a branching CH group in the structural unit shown below.

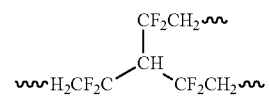

This area appears between δF −96.5 and −99.5 ppm. A branching coefficient means a proportion of this peak area to the total area of the whole $CF_2$ groups appearing between δF −88.0 and −124.0 ppm. However, since there are three neighboring branching $CF_2$ groups in one $CF_2$ chain, a calculated branching coefficient with respect to VdF unit is ⅓ of the measured value.

Here, high resolution means that the measurement is carried out using a spectrometer of 400 MHz or more.

When the branching coefficient is within a range from 30 to 300 ppm, a degree of branching is small and flowability is good. The branching coefficient is preferably not more than 280 ppm, further preferably not more than 250 ppm, from the viewpoint of good flowability. Also, the branching coefficient is preferably not less than 50 ppm, further preferably not less than 100 ppm, especially preferably not less than 150 ppm, from the viewpoint of good productivity.

(3) Mooney Viscosity ($ML_{1+10}$: 121° C.)

Mooney viscosity is a criterion of flowability and is measured according to ASTM-D 1646 and JIS K6300-1. Mooney viscosity is free from a unit.

When Mooney viscosity is within a range from 7 to 80, flowability is good, for example, at extrusion molding or injection molding, and also physical properties after crosslinking is good. Mooney viscosity is especially preferably not less than 10, further preferably not less than 14. An upper limit is preferably not more than 40, further preferably not more than 30.

(4) Molecular Weight Distribution (Mw/Mn)

Molecular weight distribution is a ratio of weight average molecular weight (Mw) to number average molecular weight (Mn) measured by gel permeation chromatography (GPC) and is a criterion of a degree of nonuniformity of a size of each molecule.

When the molecular weight distribution is within a range from 1.5 to 4, flowability is good, for example, at extrusion molding or injection molding, and also physical properties after crosslinking is good. Molecular weight distribution is especially preferably not less than 1.6, further preferably not less than 1.8. An upper limit is preferably not more than 3.0, further preferably not more than 2.5.

It is preferable that the fluorine-containing elastomer (A) has an acid value of from 0.5 to 1.0, from the viewpoint of improvement in strength. The acid value is obtained by introducing carboxyl group to the copolymer. The acid value is especially preferably not less than 0.55, further preferably not less than 0.60.

For giving an acid value (introducing carboxyl group), for example, a polymerization method explained infra which uses isoparaffin as a chain transfer agent can be employed. Isoparaffin is a chain transfer agent which is low in efficiency of restarting the polymerization, and is suitable for introducing carboxyl group to the copolymer. However, when carboxyl group is present in the copolymer, viscosity of a compound (full compound) prepared by kneading a crosslinking agent and a filler tends to increase. It is considered that carboxyl group in a branch of the copolymer or carboxyl group at its end has an influence on this increase in viscosity. However, because of small branching coefficient, the polymer (A) may be a polymer which can improve strength while inhibiting increase in viscosity of a full compound.

In the case of a polymer prepared by using isoparaffin as a chain transfer agent, hardness of a molded article after crosslinking tends to be low, and therefore, in order to give a desired hardness, means for increasing an amount of a filler can be taken and price can be decreased. In the case of a polymer prepared by using isoparaffin as a chain transfer agent, increase in amount of a filler has less effect on crosslinking characteristics and compression set. This tendency is suitable for a black formulation containing carbon black as a filler.

The fluorine-containing elastomer (A) can be prepared by the methods described, for example, in WO 01/034666 and Examples 4 and 5 of WO 2008/001895.

Concrete conditions for preparation are self-explanatory from the descriptions in WO 01/034666, Examples 4 and 5 of WO 2008/001895 and Preparation Examples described infra.

In the preparation process of the present invention, oil soluble radical polymerization initiators and water soluble radical polymerization initiators can be used as a polymerization initiator.

Known oil soluble peroxides are used as the oil soluble radical polymerization initiator to be used in the present invention. Represented examples thereof are, for instance, dialkyl peroxycarbonates such as di-isopropyl peroxydicarbonate and di-sec-butyl peroxydicarbonate; peroxyesters such as t-butyl peroxyisobutyrate and t-butyl peroxypivalate; dialkyl peroxides such as di-t-butyl peroxide; di[perfluoro(or fluorochloro)acyl] peroxides such as di($\omega$-hydro-dodecafluoroheptanoyl) peroxide, di($\omega$-hydro-tetradecafluoroheptanoyl) peroxide, di($\omega$-hydro-hexadecafluorononanoyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di($\omega$-chloro-hexafluorobutyryl) peroxide, di($\omega$-chloro-decafluorohexanoyl) peroxide, di($\omega$-chloro-tetradecafluorooctanoyl) peroxide, $\omega$-hydro-dodecafluoroheptanoyl-$\omega$-hydrohexadecafluorononanoyl-peroxide, $\omega$-chloro-hexafluorobutyryl-$\omega$-chloro-decafluorohexanoyl-peroxide, $\omega$-hydrododecafluoroheptanoyl-perfluorobutyryl-peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide and di(undecachlorodotriacontafluorodocosanoyl) peroxide; and the like.

However, peroxycarbonates such as di-isopropyl peroxycarbonate (IPP) and di-n-propyl peroxycarbonate (NPP) which are represented oil soluble initiators have a risk of explosion, is expensive and has a problem that during a polymerization reaction, adhesion of scales on side walls of a polymerization reactor easily occurs. Therefore, it is preferable to use a water soluble polymerization initiator.

Usually known water soluble peroxides are used as a water soluble radical polymerization initiator. Examples thereof are ammonium salts, potassium salts and sodium salts of persulfuric acid, perboric acid, perchloric acid, perphosphoric acid, and percarbonic acid, and t-butyl permaleate, t-butyl hydroperoxide and the like.

An amount of water soluble radical polymerization initiator is not limited particularly, and at least an amount which does not decrease the polymerization rate significantly (for example, several ppm based on water) may be added all at once at the beginning of polymerization, or intermittently or continuously during the polymerization. An upper limit of the adding amount is within a range where polymerization reaction heat can be removed from the surface of the equipment.

In the preparation process of the present invention, an emulsifying agent, a molecular weight regulator, a pH regulator and the like may be added. A molecular weight regulator may be added all at once at an initial stage of the polymerization or may be added continuously or intermittently.

There can be used, as an emulsifying agent, nonionic surfactants, anionic surfactants and cationic surfactants, and particularly preferable examples are fluorine-containing anionic surfactants such as ammonium perfluorooctanoate. An amount of the emulsifying agent (based on water as a polymerization medium) is preferably 50 to 5,000 ppm.

Examples of the chain transfer agent are, for instance, isoparaffins such as isopentane, isobutane, isohexane and isooctane; esters such as dimethyl malonate, diethyl malonate, methyl acetate, ethyl acetate, butyl acetate and dimethyl succinate; isopropanol, acetone, various mercaptans, carbon tetrachloride, cyclohexane, monoiodo methane, 1-iodomethane, 1-iodo-n-propane, isopropyl iodide, diiodo methane, 1,2-diiodomethane, 1,3-diiodo-n-propane, and the like. Among these, isoparaffins, especially isopentane are preferred from the viewpoint of improvement in strength.

In addition, a buffering agent or the like may be added optionally in an amount to an extent not to impair the effect of the present invention.

[2] Fluorine-Containing Elastomer (B)

The fluorine-containing elastomer (B) is a copolymer comprising VdF and HFP and has a specific storage modulus (G').

(1) VdF/HFP Type Copolymer

In the case of a binary copolymer, a VdF/HFP copolymer, especially a binary copolymer comprising VdF and HFP in a molar ratio of 9/1 to 5/5, further 8.5/1.5 to 6/4 is preferred since elastomeric property is not impaired.

(2) Storage Modulus (G')

7.6 g of a sample is treated at 180° C. at a displacement of 0.5° on reference to the method described in ASTM D6204 by using Rubber Process Analyzer (RPA) available from ALPHA TECHNOLOGIES and an L-type rotor by changing a frequency from 1 to 1,000 cpm, and a torque is measured. G' and G" are calculated from the measured torque. The storage modulus (G') is a value G' at 500 cpm and has no unit. In the present invention, since viscosity of the fluorine-containing elastomer (B) cannot be measured, the storage modulus (G') is assumed to be a criterion representing a molecular weight. The fluorine-containing elastomer (B) is a copolymer having a large molecular weight.

The storage modulus (G') within a range from 500 to 900 is preferred since kneadability and strength are improved without impairing flowability. The storage modulus (G') is preferably not less than 550, further preferably not less than 700.

The fluorine-containing elastomer (B) having storage modulus (G') of from 500 to 900 is prepared by the methods described in WO 01/034666, Examples 4 and 5 of WO 2008/001895 and Preparation Examples described infra. Also, the same initiators, chain transfer agents and emulsifying agents as in the preparation of the fluorine-containing elastomer (A) can be used.

A ratio of the fluorine-containing elastomer (A) to the fluorine-containing elastomer (B) is 70/30 to 90/10. When the ratio is within this range, strength is good and flowability is excellent. The ratio is especially preferably 75/25 to 80/20, further preferably 81/19 to 89/11.

Mixing of the fluorine-containing elastomers (A) and (B) can be carried out by various methods. For example, the following methods can be employed, but the method is not limited particularly to them.

(1) Method of Mixing and Co-Coagulation of Dispersions of the Fluorine-Containing Elastomers (A) and (B) (Co-Coagulation Method)

Coagulation may be carried out by mechanically applying shearing force with a homogenizer or the like. It is preferable that after drying, a coagulated product is subjected to melt-granulation. According to this method, especially uniform mixture can be obtained.

(2) Method of Dry-Blending the Fluorine-Containing Elastomers (A) and (B) (Dry-Blend Method)

Mixing is carried out with equipment for mixing by stirring, for example, an open roll, a kneader or a Banbury mixer.

(3) Method of Dividing Polymerization into Two Stages and Preparing the Fluorine-Containing Elastomers (A) and (B) in One Polymerization Reactor (Sole Reactor Method)

In this sole reactor method (3), a polymer can be prepared by a suitable polymerization process ("step polymerization"). Preferably a process is executed by the method described infra. At starting the polymerization, a relatively small amount of initiator is reacted with a relatively small amount of chain transfer agent to obtain a desired high molecular weight, and subsequently as the polymerization proceeds, an initiator and a chain transfer agent are introduced to a reactor. An accurate timing and amount of the introduction of them have an effect on the polymerization conditions and by such timing and amount, a polymer having desired characteristics can be produced. An advantage of this preparation method is such that two kinds of components can be mixed "completely" in situ. As a result, technical labor is reduced.

One of characteristics of the fluorine-containing elastomer composition of the present invention is such that strength is improved even in a state of not so sufficient kneading with a filler. Namely, the composition is characterized in that kneadability is improved and strength which is one of its characteristics is increased without lowering flowability by blending the high molecular weight fluorine-containing elastomer (B) having specific storage modulus G' to the fluorine-containing elastomer (A) having a low branching coefficient and good flowability.

Fillers usually used in the field of elastomer (rubber) can be used. Examples thereof are inorganic fillers, for example, metallic oxides such as titanium oxide, magnesium oxide, silicon oxide and zinc oxide; metallic hydroxides such as calcium hydroxide and aluminum hydroxide; carbon black, glass fiber and glass beads, and organic fillers such as polyester fiber. Particularly when black filler such as carbon black; and white fillers such as titanium oxide, magnesium oxide, silicon oxide, calcium hydroxide, silicates such as calcium silicate, magnesium silicate and aluminum silicate, and barium sulfate are blended, kneadability is improved and mechanical properties of the obtained crosslinked article are improved. In the case of a large amount of filler, in which kneading is said to be difficult, kneadability is improved, and mechanical properties of the crosslinked article are further improved. The amount of filler is preferably not less than 10 parts by mass, especially preferably not less than 15 parts by mass, further preferably not less than 20 parts by mass based on 100 parts by mass of the fluorine-containing elastomer composition (total amount of fluorine-containing elastomers (A) and (B)).

The fluorine-containing elastomer composition for crosslinking can be prepared by blending a crosslinking agent and if necessary, a crosslinking aid and a processing aid to the fluorine-containing elastomer composition of the present invention.

A crosslinking agent may be optionally selected depending on crosslinking system to be adopted. Any of polyamine crosslinking system, polyol crosslinking system and peroxide crosslinking system can be employed as a crosslinking system, and the effect of the present invention can be exhibited remarkably especially when crosslinking is carried out by polyol crosslinking system.

Examples of a crosslinking agent for polyol crosslinking system are polyhydroxy compounds such as bisphenol AF, hydroquinone, bisphenol A and diaminobisphenol AF; examples of a crosslinking agent for peroxide crosslinking system are organic peroxides such as $\alpha,\alpha'$-bis(t-butylperoxy)diisopropylbenzene, 2,5-dimethyl-2,5-di(t-butylperoxy)hexane and dicumyl peroxide; and examples of a crosslinking agent for polyamine crosslinking system are polyamine compounds such as hexamethylenediamine carbamate and N,N'-dicinnamilidene-1,6-hexamethylenediamine. The crosslinking agent is not limited to them.

The amount of crosslinking agent is from 0.01 to 10 parts by mass, preferably from 0.1 to 5 parts by mass based on 100 parts by mass of the fluorine-containing elastomer composition.

Organic base residues which are usually used for crosslinking of elastomers, such as various quaternary ammonium salts, quaternary phosphonium salts, cyclic amines and mono-functional amine compounds can be used as the crosslinking aid. Examples thereof are quaternary ammonium salts such as tetrabutylammonium bromide, tetrabutylammonium chloride, benzyltributylammonium chloride, benzyltriethylammonium chloride, tetrabutylammoniumhydrogen sulfate and tetrabutylammonium hydroxide; quaternary phosphonium salts such as benzyltriphenylphosphonium chloride, tributylallylphosphonium chloride, tributyl-2-methoxypropylphosphonium chloride and benzylphenyl (dimethylamino)phosphonium chloride; mono-functional amines such as benzylmethylamine and benzylethanolamine; cyclic amines such as 1,8-diazabicyclo[5.4.0]-undec-7-ene; and the like.

An amount of crosslinking aid is from 0.01 to 10 parts by mass, preferably from 0.1 to 5.0 parts by mass based on 100 parts by mass of the fluorine-containing elastomer composition.

Kneading can be carried out by usual kneading method, for example, by using an open roll, a kneader or a Banbury mixer under usual kneading conditions. When the fluorine-containing elastomer composition of the present invention is used, kneading time can be decreased, and mechanical properties, especially strength are improved.

Next, nonlimiting examples of molded articles which the crosslinked article of the present invention can be preferably applied to are as follows.

Molded Articles for General Applications:

The crosslinked article is suitable for applications to packing, O-ring, hose, other sealing material, diaphragm and valve for amine, oil, chemical, steam and weather resistance in the fields of transportation such as automobile, ship and airplane; similar packing, sealing material for oxygen sensor, sealing material for sensor, O-ring, sealing material, diaphragm, valve, hose, roll and tube in chemical plant; similar packing, O-ring, hose, sealing material, belt, diaphragm, valve, roll and tube in food plant equipment and food processing appliances (including domestic appliances); similar packing O-ring, hose, sealing material, diaphragm, valve and tube in atomic power plant; similar packing, O-ring, hose, sealing material, diaphragm, valve, roll, tube, mandrel, electric wire, flexible joint, belt, rubber plate and weather strip in general industrial parts; and roll, roll blade and belt for PPC copying machine.

Further, there can be exemplified the following applications.

(i) Automobile-Related Applications
(1) For Sealing
Crank shaft seal
Gear box seal
Power piston packing
Cylinder liner seal
Valve stem seal
Front pump seal of automatic transmission gear
Rear axle pinion seal
Universal joint gasket
Speed meter pinion seal
Foot brake piston cup
O-ring and oil seal of torque transmission
Seal of exhaust gas recirculation combustion equipment
Bearing seal
Sealing material for oxygen sensor
(2) For Hose
EGR tube
Twin carburetter tube
(3) For Diaphragm
Diaphragm for sensor of carburetter
(4) Others
Vibration proof rubber (engine mount, exhaust line, etc.)
Hose for recirculation combustion equipment (ii) Chemical Industry-Related Applications
(1) For Seal
Seal of pump, flow meter and piping for chemicals
Seal of heat exchanger
Packing of glass cooler of sulfuric acid producing equipment
Seal of agricultural chemical sprinkler and transfer pump
Seal of gas piping
Seal for plating solution
Packing of high temperature vacuum dryer
Roll seal of belt for paper making
Seal of fuel cell
Joint seal of air duct
(2) For Roll
Trichlene resistant roll (for dyeing of fiber)
(3) Others
Acid resistant hose (for concentrated sulfuric acid)
Packing for tube joint of gas chromatography and pH meter
Chlorine gas transfer hose
Rainwater drain hose of benzene and toluene tanks
Seal, tube, diaphragm and valve parts for analytical devices and physical and chemical appliances
(iii) Applications to General Devices and Appliances
(1) For Seal
Seal of hydraulic equipment and lubrication equipment
Bearing seal
Seal of dry copying machine
Seal of window, etc. of dry cleaner
Seal of uranium hexafluoride concentrator
Seal (vacuum) valve of cyclotron
Seal of automatic packaging machine
(2) Others
Printing roll, scraper, tube and valve parts of printing facilities
Coating roll, scraper, tube and valve parts of coating facilities
Ink tube, roll and belt of printer
Belt and roll of dry copying machine
Diaphragm of pump for analyzing sulfur dioxide gas and chlorine gas in the air (pollution-related meters)
Roll and belt of printing machine
Squeeze roll for acid rinsing
(iv) Plane-Related Applications
Jet engine valve stem seal
Hose, gasket and O-ring for feeding fuel
Rotating shaft seal
Gasket of hydraulic equipment
Seal of fire-proof wall
(v) Ship-Related Applications
Seal of stern screw propeller shaft
Suction and exhaust valve stem seal of diesel engine
Valve seal of butterfly valve
Shaft seal of butterfly valve
(vi) Food- and Medicine-Related Applications
Seal of plate type heat exchanger
Seal of electromagnetic valve of vending machine
Plug for chemicals
(vii) Electrical Applications
Oil-insulating cap for Shin-kansen train
Venting seal of liquid seal transformer
Oil well cable jacket
(viii) Oil Excavation-Related Applications
Seal for packer
Safety valve seal
Sand control seal
Flow control seal
Mud pump seal
Other seals for pump to be used for excavation Further, the crosslinked article can be used for O-ring, sealing material, hose, tube, diaphragm, roll, lining and coating to be used for portions required to have plasma resistance in equipment for manufacturing semiconductor, liquid crystal panel, plasma display panel, plasma address liquid crystal panel, field emission display panel and solar cell substrate, for example, CVD equipment, etching equipment, oxidation/diffusion equipment, sputtering equipment, ashing equipment, ion implantation equipment and exhaust equipment; O-ring, sealing material, hose, tube, diaphragm and roll to be used for portions required to have chemical resistance in wet etcher, washing equipment, piping for chemicals and gas piping; and O-ring, sealing material, hose, tube, diaphragm and roll to be used for portions required to be free from dust and metal in the above-mentioned equipment.

Other examples of portions required to have chemical resistance are O-ring, sealing material, hose, tube, diaphragm of pump and wafer transfer roll to be used for resist developing solution, releasing solution and wafer washing solution in equipment for manufacturing semiconductor, liquid crystal panel and plasma display panel.

EXAMPLE

The present invention is then explained by means of examples, but is not limited to them.

Equipment and measuring conditions used for evaluation of characteristics are as follows.

(1) Branching Coefficient

Measuring sample is dissolved in acetone at a concentration of about 30%. According to measurement by $^{19}$F-NMR (model 400 available from VARIAN), branch peak area and whole $CF_2$ peak area are calculated, and a branching coefficient is determined by the obtained results.

(2) Mooney Viscosity ($ML_{1+10}$: 121° C.)

Mooney viscosity is measured with MOONY MV2000 (available from ALPHA TECHNOLOGIES) according to ASTM-D 1646 and JIS K6300-1.

(3) Molecular Weight Distribution (Mw/Mn)

A molecular weight distribution is calculated from a weight average molecular weight Mw and a number average molecular weight Mn with the following equipment under the following conditions.

Equipment: HLC-8020 (available from TOSO CORPORATION)
Column: Two GPC KF-806M columns
One GPC KF-801 column
One GPC KF-802 column
Detector: Differential refractometer
Developing solution: Tetrahydrofuran
Temperature: 35° C.
Concentration of sample: 0.1% by weight
Standard sample: Various monodisperse polystyrenes ((Mw/Mn)=1.14 (Max)), TSK Standard POLYSTYRENE (available from TOSO CORPORATION)

(4) Composition of Copolymer

Measurement is Carried out by NMR Under the Following Conditions.

Measuring Equipment: Model 400 Available from VARIAN
$^{19}$F-NMR measuring condition: 400 MHz (trichlorofluoromethane=0 ppm (5) Average Particle Size of Fluorine-Containing Elastomer (Fluorine-Containing Copolymer)

0.05 ml of emulsion to be measured is diluted with 8 ml of pure water to make a sample, and a particle size is measured (by dynamic light scattering method) at room temperature with MICROTRAC UPA (available from HONEYWELL). The obtained data is deemed as an average particle size.

(6) Solid Content

Solid content is calculated from mass reduction after drying the obtained dispersion at 120° C. for two hours.

(7) Number of Particles

Assuming a specific gravity of a fluorine-containing copolymer to be 1.8, the number of particles is calculated from an average particle size of the obtained fluorine-containing copolymer in the form of rubber and a fluorine-containing copolymer in a dispersion.

(8) Storage Modulus (G')

7.6 g of a sample is treated at 180° C. at a displacement of 0.5° on reference to the method described in ASTM D6204 by using Rubber Process Analyzer (RPA) available from ALPHA TECHNOLOGIES and an L-type rotor by changing a frequency from 1 to 1,000 cpm, and a torque is measured. G' and G" are calculated from the measured torque. The storage modulus (G') is a value G' at 500 cpm and has no unit.

(9) Acid Value 1 to 4 g of a sample is put in a 50 ml screw tube and acetone is added thereto, followed by one-hour stirring at room temperature to dissolve the sample. The obtained solution is subjected to potentiometric titration with 0.01 mol/liter ethanol solution of potassium hydroxide. It is an acid value of a sample (polymer) only that is measured, and when an inorganic reagent is present in a polymer as an assistant, it need be removed before the measurement.

Analyzer: DL-58 available from METTLER TOLEDO
Electrode: DG 113
An acid value is determined by the following equation.

$$\text{Acid value of sample} = (56.1 \times c \times a \times F)/s \times 100$$

a: Titration amount of sample (ml)
c: Molar concentration of titration solution (mol/liter)
F: Factor of titration solution
s: Weight of sample (g)
56.1: Molecular weight of KOH

(10) Crosslinking Characteristics (Crosslinking Method)

The polymer (elastomer) is subjected to polyol crosslinking in the standard formulation under standard vulcanization conditions.

Standard Formulation 1 (Black)
Fluorine-containing elastomer composition: 100 parts by mass
Crosslinking agent: 2.17 parts by mass of bisphenol AF
Crosslinking aid: 0.43 part by mass of benzyltriphenylphosphonium chloride
Filler 1: 3 parts by mass of magnesium oxide (MA-150)
Filler 2: 6 parts by mass of calcium hydroxide
Filler 3: 35 parts by mass of carbon black (N990)
Processing aid: 1 part by mass of carnauba wax Standard Formulation 2 (White)
Fluorine-containing elastomer composition: 100 parts by mass
Crosslinking agent: 2.17 parts by mass of bisphenol AF
Crosslinking aid: 0.43 part by mass of benzyltriphenylphosphonium chloride
Filler 1: 3 parts by mass of magnesium oxide (MA-150)
Filler 2: 6 parts by mass of calcium hydroxide
Filler 4: 15 parts by mass of calcium silicate (NYAD 400)
Processing aid: 1 part by mass of carnauba wax Standard Formulation 3 (Bituminous Coal Carbon)
Fluorine-containing elastomer composition: 100 parts by mass
Crosslinking agent: 0.48 part by mass of bisphenol AF
Crosslinking aid: 2.14 parts by mass of VITON CURATIVE No. 50 (available from Du Pont)
Filler 1: 6 parts by mass of magnesium oxide (MA-150)
Filler 3: 15 parts by mass of carbon black (N990)
Filler 5: 15 parts by mass of bituminous coal carbon black (Mineral Black 325BA available from Keystonefiller 85 Mfg., Co.)

Standard Formulation 4 (Black)
    Fluorine-containing elastomer composition: 100 parts by mass
    Crosslinking agent: 2.17 parts by mass of bisphenol AF
    Crosslinking aid: 0.43 part by mass of benzyltriphenylphosphonium chloride
    Filler 1: 3 parts by mass of magnesium oxide (MA-150)
    Filler 2: 6 parts by mass of calcium hydroxide
    Filler 3: 20 parts by mass of carbon black (N990)
    Processing aid: 1 part by mass of carnauba wax
Standard Formulation 5 (Black)
    Fluorine-containing elastomer composition: 100 parts by mass
    Crosslinking agent: 2.17 parts by mass of bisphenol AF
    Crosslinking aid: 0.43 part by mass of benzyltriphenylphosphonium chloride
    Filler 1: 3 parts by mass of magnesium oxide (MA-150)
    Filler 2: 6 parts by mass of calcium hydroxide
    Filler 3: 45 parts by mass of carbon black (N990)
    Processing aid: 1 part by mass of carnauba wax
Standard Crosslinking Conditions
    Kneading method: Kneading with rolls
    Press-crosslinking: at 170° C. for 10 minutes
    Oven-crosslinking: at 230° C. for 24 hours
    A crosslinking curve at 170° C. is obtained at the primary press-crosslinking with a JSR Curastometer model II by the above-mentioned crosslinking method and then a minimum viscosity (ML), degree of crosslinking (MH), induction time ($T_{10}$) and optimum crosslinking time ($T_{90}$) are determined.
(11) Mechanical Properties
(Physical Properties in Normal State)

The components of the above-mentioned standard formulation are subjected to primary press-crosslinking and secondary oven-crosslinking under the above-mentioned standard crosslinking conditions to make a 2 mm thick sheet. 100% modulus (M100), tensile strength at break (Tb) and tensile elongation at break (Eb) are measured according to JIS-K6251 and hardness (Hs at peak and 3 seconds after) is measured according to JIS-K6253.

(Compression Set)

The components of the above-mentioned standard formulations are subjected to primary press-crosslinking and secondary oven-crosslinking under the above-mentioned standard crosslinking conditions to make O-ring (P-24). According to JIS-K6301, compression set after the primary-press crosslinking and compression set (CS) after the secondary oven-crosslinking are measured (Measuring is carried out using a sample subjected to holding at 200° C. for 70 hours under 25% compression and then allowed to stand for 30 minutes in a 25° C. constant temperature chamber).

Preparation Example 1

(Preparation of Fluorine-Containing Elastomer (A))

A 3 liter stainless steel autoclave was charged with 1,712 g of pure water, 0.344 g of 50% aqueous solution of $CH_2=CFCF_2CF(CF_3)OCF_2CF_2COONH_4$ and 1.378 g of 50% aqueous solution of $F(CF_2)_5COONH_4$. After having been sufficiently replaced with nitrogen gas, the inside of a system was brought to reduced pressure. Then, while stirring at 600 rpm, a VdF/HFP monomer mixture was introduced so as to be 42/58 in mole % and the inside temperature was elevated to 80° C. to give an inside pressure of a polymerization reactor of 6 MPa.

Then, a solution of polymerization initiator prepared by dissolving 0.512 g of ammonium persulfate (APS) in 10 ml of pure water and 4.56 g of isopentane were introduced with pressurized nitrogen gas to initiate a reaction.

As the polymerization proceeded, when the inside pressure started decreasing, a VdF/HFP monomer mixture (78/22 in mole %) was supplied to keep the inside pressure at 6 MPa. Also, every three hours, a solution of polymerization initiator prepared by dissolving 0.256 g of APS in 10 ml of pure water was introduced with pressurized nitrogen gas. When the amount of monomer mixture reached 470 g, unreacted monomers were discharged and the autoclave was cooled to obtain a dispersion having a solid concentration of 26.3% by mass.

The average particle size of the obtained fluorine-containing elastomer was 87 nm. According to NMR analysis, the elastomer was a copolymer comprising VdF/HFP=78/22 (mole %), and the number of particles in the dispersion was $5.8 \times 10^{14}$ (per 1 g of water).

To 200 g of this dispersion was added 27% by mass aqueous solution of aluminum sulfate to carry out coagulation. The obtained coagulated product was washed with water and dried to obtain a fluorine-containing elastomer (A-1). Mooney viscosity ($ML_{1+10}$: 121° C.) was 5. Also a branching coefficient measured was 220 ppm. A molecular weight distribution Mw/Mn measured by GPC was 1.9. An acid value was 0.85.

Preparation Examples 2 to 4

(Preparation of Fluorine-Containing Elastomers (A-2) to (A-4))

Fluorine-containing elastomers (A-2) to (A-4) were prepared in the same manner as in Preparation Example 1 except that an amount of isopentane was changed as shown in Table 1. Conditions for preparation and physical properties of the obtained fluorine-containing elastomers (A-2) to (A-4) are shown in Table 1.

Preparation Examples 5 and 6

(Preparation of Fluorine-Containing Elastomers (A-5) and (A-6))

Fluorine-containing elastomers (A-5) and (A-6) were prepared in the same manner as in Preparation Example 1 except that diethyl malonate was used instead of isopentane as a chain transfer agent and an amount of APS was changed as shown in Table 1. Conditions for preparation and physical properties of the obtained fluorine-containing elastomers (A-5) and (A-6) are shown in Table 1.

TABLE 1

| | | Preparation Example | | | | | |
|---|---|---|---|---|---|---|---|
| | | 1 | 2 | 3 | 4 | 5 | 6 |
| Polymerization conditions | | | | | | | |
| Monomer composition at initial charge (mole %) | VdF/HFP | 42/58 | 42/58 | 41/59 | 41/59 | 42/58 | 42/58 |
| Monomer composition during continuous polymerization (mole %) | VdF/HFP | 78/22 | 78/22 | 78/22 | 78/22 | 78/22 | 78/22 |

TABLE 1-continued

| | | Preparation Example | | | | | |
|---|---|---|---|---|---|---|---|
| | | 1 | 2 | 3 | 4 | 5 | 6 |
| Polymerization initiator (g) | APS initial | 0.512 | 0.512 | 0.512 | 0.512 | 0.258 | 0.207 |
| | additional (every 3 hours) | 0.256 | 0.256 | 0.256 | 0.256 | — | — |
| Chain transfer agent (g) | Isopentane | 4.56 | 4.04 | 3.56 | 3.09 | — | — |
| | Diethyl malonate | — | — | — | — | 9.99 | 6.89 |
| Polymerization time (min) | | 409 | 331 | 306 | 247 | 144 | 168 |
| Amount of monomers charged during continuous polymerization (weighing capacity) (g) | | 470 | 470 | 470 | 470 | 470 | 470 |
| Results of polymerization | | | | | | | |
| Amount of dispersion (g) | | 2,363 | 2,316 | 2,289 | 2,335 | 2,320 | 2,312 |
| Solid content (mass %) | | 26.3 | 25.6 | 26.2 | 25.6 | 25.5 | 26.7 |
| Yield of polymer (g) | | 621 | 593 | 600 | 598 | 592 | 617 |
| VdF/HFP (mole %) | | 78/22 | 78/22 | 78/22 | 78/22 | 78/22 | 78/22 |
| Average particle size (nm) | | 87 | 95 | 98 | 108 | 109 | 109 |
| Number of particles ($10^{14}$/1 g of water) | | 5.8 | 4.0 | 4.0 | 6.6 | 2.8 | 3.0 |
| $ML_{1+10}$ (121° C.) | | 5 | 11 | 15 | 22 | 21 | 42 |
| Branching coefficient (ppm) | | 220 | 250 | 190 | 220 | 180 | 250 |
| Molecular weight distribution Mw/Mn | | 1.9 | 2.0 | 2.2 | 2.1 | 2.2 | 2.0 |
| Acid value (mgKOH/g) | | 0.85 | 0.76 | 0.67 | 0.82 | 0.24 | 0.19 |

Preparation Example 7

(Preparation of Fluorine-Containing Elastomer (B-1))

A 3 liter stainless steel autoclave was charged with 1,712 g of pure water, 0.344 g of 50% aqueous solution of $CH_2=CFCF_2CF(CF_3)OCF_2CF_2COONH_4$ and 1.378 g of 50% aqueous solution of $F(CF_2)_5COONH_4$. After having been sufficiently replaced with nitrogen gas, the inside of a system was brought to reduced pressure. Then, while stirring at 600 rpm, a VdF/HFP monomer mixture was introduced so as to be 42/58 in mole % and the inside temperature was elevated to 80° C. to give an inside pressure of a polymerization reactor of 6 MPa.

Then, a solution of polymerization initiator prepared by dissolving 0.524 g of APS in 10 ml of pure water and 1.00 g of isopropyl alcohol were introduced with pressurized nitrogen gas to initiate a reaction.

As the polymerization proceeded, when the inside pressure started decreasing, a VdF/HFP monomer mixture (78/22 in mole %) was supplied to keep the inside pressure at 6 MPa. When the amount of additional monomer mixture reached 470 g, unreacted monomers were discharged and the autoclave was cooled to obtain a dispersion having a solid concentration of 27.0% by mass. The average particle size of the fluorine-containing elastomer particles was 114 nm. According to NMR analysis, the elastomer was a copolymer comprising VdF/HFP=78/22 (mole %), and the number of particles in the dispersion was $2.6 \times 10^{14}$ (per 1 g of water).

To 200 g of this dispersion was added 27% by mass aqueous solution of aluminum sulfate to carry out coagulation. The obtained coagulated product was washed with water and dried to obtain a fluorine-containing elastomer (B-1). Mooney viscosity ($ML_{1+10}$: 121° C.) of this fluorine-containing elastomer could not be measured, and as a result of measurement with RPA, storage modulus (G') at a frequency (ω) of 500 cpm was 309.

Preparation Examples 8 to 10

(Preparation of Fluorine-Containing Elastomer (B))

Fluorine-containing elastomers (B-2) to (B-4) were prepared in the same manner as in Preparation Example 7 except that the amounts of APS and isopropyl alcohol as a chain transfer agent were changed as shown in Table 2. Conditions for preparation and physical properties of the obtained fluorine-containing elastomers (B-2) to (B-4) are shown in Table 2.

TABLE 2

| | | Preparation Example | | | |
|---|---|---|---|---|---|
| | | 7 | 8 | 9 | 10 |
| Polymerization conditions | | | | | |
| Monomer composition at initial charge (mole %) | VdF/HFP | 42/58 | 42/58 | 42/58 | 42/58 |
| Monomer composition during continuous polymerization (mole %) | VdF/HFP | 78/22 | 78/22 | 78/22 | 78/22 |
| Polymerization initiator (g) | APS initial | 0.524 | 0.252 | 0.086 | 0.086 |
| Chain transfer agent (g) | Isopropyl alcohol | 1.00 | 0.25 | 0.034 | 0.018 |
| Polymerization time (min) | | 108 | 72 | 116 | 114 |
| Amount of monomers charged during continuous polymerization (weighing capacity) (g) | | 470 | 470 | 470 | 470 |

TABLE 2-continued

|  | Preparation Example | | | |
| --- | --- | --- | --- | --- |
|  | 7 | 8 | 9 | 10 |
| Results of polymerization | | | | |
| Amount of dispersion (g) | 2,342 | 2,271 | 2,387 | 2,315 |
| Solid content (mass %) | 27.0 | 26.0 | 24.4 | 23.4 |
| Yield of polymer (g) | 633 | 590 | 582 | 542 |
| VdF/HFP (mole %) | 78/22 | 78/22 | 78/22 | 78/22 |
| Average particle size (nm) | 114 | 110 | 136 | 144 |
| Number of particles ($10^{14}$/1 g of water) | 2.6 | 2.8 | 1.4 | 2.3 |
| Storage modulus (G') | 309 | 611 | 813 | 847 |

Preparation Example 11

(Preparation of Fluorine-Containing Elastomer Composition by Low-Pressure Polymerization Method)

A 3 liter stainless steel autoclave was charged with 1,690 g of pure water, and after having been sufficiently replaced with nitrogen gas, the inside of a system was brought to a reduced pressure. Subsequently, while stirring at 600 rpm, a VdF/HFP monomer mixture was introduced so as to be 65/35 in mole % and the inside temperature was elevated to 80° C. to give an inside pressure of a polymerization reactor of 1.2 MPa.

Then, a solution of polymerization initiator prepared by dissolving 1.07 g of APS in 10 ml of pure water was introduced with pressurized nitrogen gas to initiate a reaction.

As the polymerization proceeded, when the inside pressure started decreasing, a VdF/HFP monomer mixture (78/22 in mole %) was supplied to keep the inside pressure at 1.2 MPa. In addition, an aqueous solution of APS having a concentration of 4.1% was continuously supplied. The amount of the first additional charge of VdF/HFP monomer mixture was 26 g, and isopentane was dividedly charged with pressurized nitrogen gas eight times until completion of the reaction and the total amount of isopentane was 0.74 g. The total amount of the aqueous solution of APS was 37 g. When the amount of additional monomer mixture reached 540 g, unreacted monomers were discharged and the autoclave was cooled to obtain a dispersion having a solid concentration of 23.6% by mass. The average particle size of the obtained fluorine-containing copolymer particles was 310 nm. According to NMR analysis, the copolymer was one comprising VdF/HFP=78/22 (mole %), and the number of particles in the dispersion was $0.11 \times 10^{14}$ (per 1 g of water).

To 200 g of this dispersion was added 27% by mass aqueous solution of aluminum sulfate to carry out coagulation. The obtained coagulated product was washed with water and dried to obtain a fluorine-containing elastomer. Mooney viscosity ($ML_{1+10}$: 121° C.) of this fluorine-containing elastomer was 36. The measured branching coefficient of the elastomer was 700 ppm. As a result of measurement by GPC, the molecular weight distribution Mw/Mn was 3.5 and the acid value was 0.34. The results are collectively shown in Table 3.

TABLE 3

|  |  | Prep. Ex. 11 |
| --- | --- | --- |
| Polymerization conditions | | |
| Monomer composition at initial charge (mole %) | VdF/HFP | 65/35 |
| Monomer composition during continuous polymerization (mole %) | VdF/HFP | 78/22 |
| Polymerization initiator (g) | APS initial | 1.07 |
|  | total of 4.1% aqueous solution | 37 |
| Chain transfer agent (g) | total of isopentane dividedly supplied | 0.74 |
| Polymerization time (min) | | 214 |
| Amount of monomers charged during continuous polymerization (weighing capacity) (g) | | 540 |
| Results of polymerization | | |
| Amount of dispersion (g) | | 2,270 |
| Solid content (mass %) | | 23.6 |
| Yield of polymer (g) | | 536 |
| VdF/HFP (mole %) | | 78/22 |
| Average particle size (nm) | | 310 |
| Number of particles ($10^{14}$/1 g of water) | | 0.11 |
| $ML_{1+10}$ (121° C.) | | 36 |
| Branching coefficient (ppm) | | 700 |
| Molecular weight distribution Mw/Mn | | 3.5 |
| Acid value (mgKOH/g) | | 0.34 |

Preparation Example 12

(Preparation of Fluorine-Containing Elastomer Composition by One Reactor Method)

A 3 liter stainless steel autoclave was charged with 1,712 g of pure water, 0.344 g of 50% aqueous solution of $CH_2=CFCF_2CF(CF_3)OCF_2CF_2COONH_4$ and 1.378 g of 50% aqueous solution of $F(CF_2)_5COONH_4$ and after having been sufficiently replaced with nitrogen gas, the inside of a system was brought to a reduced pressure. Subsequently, while stirring at 600 rpm, a VdF/HFP monomer mixture was introduced so as to be 42/58 in mole % and the inside temperature was elevated to 80° C. to give an inside pressure of a polymerization reactor of 6 MPa.

Then, a solution of polymerization initiator prepared by dissolving 0.086 g of APS in 10 ml of pure water and 0.034 g of isopentane were introduced with pressurized nitrogen gas to initiate a reaction (1st stage).

As the polymerization proceeded, when the inside pressure started decreasing, a VdF/HFP monomer mixture (78/22 in mole %) was supplied to keep the inside pressure at 6 MPa. When 71 g of the monomer mixture had been charged, a solution of polymerization initiator prepared by dissolving 0.517 g of APS in 10 ml of pure water and 3.06 g of isopentane were introduced with pressurized nitrogen gas in the same manner as in the initiation of polymerization, and the reaction was continued (2nd stage). When the amount of additional VdF/HFP monomer mixture reached 470 g, unreacted monomers were discharged and the autoclave was cooled to obtain a dispersion having a solid concentration of 26.3% by mass. The average particle size of the obtained fluorine-containing copolymer particles was 113 nm. According to NMR analysis, the copolymer was one comprising VdF/HFP=78/22 (mole %), and the number of particles in the dispersion was $2.6 \times 10^{14}$ (per 1 g of water).

To 200 g of this dispersion was added 27% by mass aqueous solution of aluminum sulfate to carry out coagulation. The obtained coagulated product was washed with water and dried to obtain a fluorine-containing elastomer composition. Mooney viscosity ($ML_{1+10}$: 121° C.) of this fluorine-containing elastomer was 31. As a result of measurement by GPC, the molecular weight distribution Mw/Mn was 1.2. The results are collectively shown in Table 4.

TABLE 4

|  |  | Prep. Ex. 12 |
| --- | --- | --- |
| Polymerization conditions |  |  |
| Monomer composition at initial charge (mole %) | VdF/HFP | 42/58 |
| Monomer composition during continuous polymerization (mole %) | VdF/HFP | 78/22 |
| Polymerization initiator (g) | APS initial | 0.086 |
| additional (every 3 hours) |  | 0.517 |
| Chain transfer agent (g) | isopentane 1st stage | 0.034 |
| 2nd stage |  | 3.06 |
| Polymerization time (min) |  | 286 |
| Amount of monomers charged during continuous polymerization (weighing capacity) (g) |  | 470 |
| Results of polymerization |  |  |
| Amount of dispersion (g) |  | 2,337 |
| Solid content (mass %) |  | 26.3 |
| Yield of polymer (g) |  | 614 |
| VdF/HFP (mole %) |  | 78/22 |
| Average particle size (nm) |  | 113 |
| Number of particles ($10^{14}$/1 g of water) |  | 2.6 |
| $ML_{1+10}$ (121° C.) |  | 31 |
| Branching coefficient (ppm) |  | — |
| Molecular weight distribution Mw/Mn |  | 2.1 |
| Acid value (mgKOH/g) |  | — |

Example 1

(Preparation of Black Fluorine-Containing Elastomer Composition for Crosslinking)

The dispersion of fluorine-containing elastomer (A-2) prepared in Preparation Example 2 and the dispersion of fluorine-containing elastomer (B-3) prepared in Preparation Example 9 were blended in a weight ratio of solid content of 85/15, and thereto was added a 27% by mass aqueous solution of aluminum sulfate to carry out co-coagulation. The obtained coagulated product was washed with water and dried to obtain 450 g of a fluorine-containing elastomer composition. Mooney viscosity ($ML_{1+10}$: 121° C.) of this composition was 27.

In a 0.3 L kneader, to 100 parts by mass of this fluorine-containing elastomer composition were added 2.17 parts by mass of bisphenol AF and 0.43 part by mass of benzyltriphenylphosphonium chloride (BTPPC), followed by kneading for 12 minutes while controlling the kneader temperature so that a temperature of the mixture was kept at 140° to 150° C., to obtain a pre-mixture. Further, in the 0.3 L kneader, to 100 parts by mass of the fluorine-containing elastomer composition were added 35 parts by mass of carbon black (N990), 3 parts by mass of magnesium oxide (MA-150), 6 parts by mass of calcium hydroxide (Caldic 2000) and 1 part by mass of carnauba wax, and the mixture was kneaded for 180 seconds while controlling the kneader temperature so that a temperature of the mixture was kept at 70° to 100° C., to obtain a fluorine-containing elastomer composition for crosslinking. Mooney viscosity ($ML_{1+10}$: 121° C.) of the obtained composition for crosslinking was 52. Crosslinking characteristics of this composition for crosslinking and physical properties of a crosslinked article obtained by press-crosslinking and then oven-crosslinking of the composition are shown in Table 5.

Examples 2 to 6

(Preparation of Black Fluorine-Containing Elastomer Composition for Crosslinking)

Fluorine-containing elastomer compositions were prepared by co-coagulation in the same manner as in Example 1 except that the fluorine-containing elastomers shown in Table 5 were used as the fluorine-containing elastomer (A) and the fluorine-containing elastomer (B), and pre-mixtures and fluorine-containing elastomer compositions for crosslinking were prepared in the same manner as in Example 1.

Mooney viscosities ($ML_{1+10}$: 121° C.) of the fluorine-containing elastomer compositions prepared by co-coagulation and the compositions for crosslinking, crosslinking characteristics of the compositions for crosslinking and physical properties of crosslinked articles obtained by press-crosslinking and then oven-crosslinking of these compositions are shown in Table 5.

Comparative Example 1

A fluorine-containing elastomer composition for crosslinking was prepared in the same manner as in Example 1 except that the dispersion of fluorine-containing elastomer (A-3) prepared in Preparation Example 3 and the dispersion of fluorine-containing elastomer (B-1) prepared in Preparation Example 7 and having storage modulus of 309 being out of the range of the present invention were blended in a weight ratio of solid content of 85/15. Mooney viscosity ($ML_{1+10}$: 121° C.) of the obtained fluorine-containing elastomer composition for crosslinking, crosslinking characteristics of the composition for crosslinking and physical properties of a crosslinked article obtained by press-crosslinking and then oven-crosslinking of the composition are shown in Table 5.

Comparative Example 2

A fluorine-containing elastomer composition for crosslinking was prepared in the same manner as in Example 1 except that the dispersion of fluorine-containing elastomer (A-1) prepared in Preparation Example 1 and having Mooney viscosity ($ML_{1+10}$: 121° C.) of 5 being out of the range of the present invention and the dispersion of fluorine-containing elastomer (B-3) prepared in Preparation Example 9 were blended in a weight ratio of solid content of 85/15. Mooney viscosity ($ML_{1+10}$: 121° C.) of the obtained fluorine-containing elastomer composition for crosslinking, crosslinking characteristics of the composition for crosslinking and physical properties of a crosslinked article obtained by press-crosslinking and then oven-crosslinking of the composition are shown in Table 5.

Comparative Example 3

A fluorine-containing elastomer composition for crosslinking was prepared in the same manner as in Example 1 except that the dispersion of fluorine-containing elastomer (A-7) prepared in Preparation Example 11 and having a branching coefficient of 700 ppm and an acid value of 0.34 (mgKOH/g) which were out of the range of the present invention and the dispersion of fluorine-containing elastomer (B-3) prepared in Preparation Example 9 were blended in a weight ratio of solid content of 85/15. Mooney viscosity ($ML_{1+10}$: 121° C.) of the obtained fluorine-containing elastomer composition for crosslinking, crosslinking characteristics of the composition for crosslinking and physical properties of a crosslinked article obtained by press-crosslinking and then oven-crosslinking of the composition are shown in Table 5.

Comparative Example 4

Only the fluorine-containing elastomer (A-6) prepared in Preparation Example 6 and satisfying the conditions (A) of the present invention was coagulated by adding a 27% by mass aqueous solution of aluminum sulfate thereto without co-coagulation with the fluorine-containing elastomer (B). A fluorine-containing elastomer composition for crosslinking was prepared in the same manner as in Example 1 except that the obtained coagulated product was washed with water and dried. Mooney viscosity ($ML_{1+10}$: 121° C.) of the obtained fluorine-containing elastomer composition for crosslinking, crosslinking characteristics of the composition for crosslinking and physical properties of a crosslinked article obtained by press-crosslinking and then oven-crosslinking of the composition are shown in Table 5.

TABLE 5

|  | Example ||||||
|---|---|---|---|---|---|---|
|  | 1 | 2 | 3 | 4 | 5 | 6 |
| Fluorine-containing elastomer (A) | | | | | | |
| Kind | Prep. Ex. 2 | Prep. Ex. 2 | Prep. Ex. 3 | Prep. Ex. 2 | Prep. Ex. 4 | Prep. Ex. 4 |
| Amount (part by mass) | 85 | 85 | 85 | 85 | 85 | 90 |
| Fluorine-containing elastomer (B) | | | | | | |
| Kind | Prep. Ex. 9 | Prep. Ex. 8 | Prep. Ex. 9 | Prep. Ex. 10 | Prep. Ex. 9 | Prep. Ex. 9 |
| Amount (part by mass) | 15 | 15 | 15 | 15 | 15 | 10 |
| Formulation | Standard formulation 1 | Standard formulation 1 | Standard formulation 1 | Standard formulation 1 | Standard formulation 1 | Standard formulation 1 |
| Mooney viscosity ($ML_{1+10}$: 121° C.) | | | | | | |
| Fluorine-containing elastomer composition | 27 | 28 | 31 | 38 | 48 | 40 |
| Fluorine-containing elastomer composition for crosslinking | 52 | 59 | 59 | 64 | 69 | 68 |
| Crosslinking characteristics | | | | | | |
| Crosslinking temperature (° C.) | 170 | 170 | 170 | 170 | 170 | 170 |
| ML (kgf*cm) | 0.2 | 0.2 | 0.3 | 0.2 | 0.2 | 0.3 |
| MH (kgf*cm) | 4.8 | 4.8 | 5.8 | 4.7 | 5.5 | 5.7 |
| Crosslinking rate $T_{10}$ (min) | 4.3 | 4.1 | 3.8 | 4.5 | 4.2 | 4.2 |
| Crosslinking rate $T_{90}$ (min) | 6.1 | 6.5 | 5.9 | 6.7 | 6.8 | 6.1 |
| Physical properties in normal state | | | | | | |
| Tensile stress $M_{100}$ (MPa) | 8.0 | 8.9 | 9.9 | 9.0 | 9.7 | 10.0 |
| TB (Tensile strength) (MPa) | 14.2 | 13.9 | 15.9 | 13.8 | 15.2 | 15.4 |
| EB (Elongation) (%) | 163 | 172 | 160 | 160 | 161 | 166 |
| Hardness Peak | 85 | 84 | 82 | 84 | 84 | 84 |
| Hardness 3 seconds after | 80 | 79 | 78 | 80 | 80 | 80 |
| Compression set (200° C. × 70 hr) | 17 | 16 | 15 | 16 | 16 | 14 |

|  | Comparative Example ||||
|---|---|---|---|---|
|  | 1 | 2 | 3 | 4 |
| Fluorine-containing elastomer (A) | | | | |
| Kind | Prep. Ex. 3 | Prep. Ex. 1 | Prep. Ex. 11 | Prep. Ex. 6 |
| Amount (part by mass) | 85 | 85 | 85 | 100 |
| Fluorine-containing elastomer (B) | | | | |
| Kind | Prep. Ex. 7 | Prep. Ex. 9 | Prep. Ex. 9 | — |
| Amount (part by mass) | 15 | 15 | 15 | — |
| Formulation | Standard formulation 1 | Standard formulation 1 | Standard formulation 1 | Standard formulation 1 |
| Mooney viscosity ($ML_{1+10}$: 121° C.) | | | | |
| Fluorine-containing elastomer composition | 23 | 16 | 61 | 42 |
| Fluorine-containing elastomer composition for crosslinking | 50 | 32 | 109 | 82 |

TABLE 5-continued

| Crosslinking characteristics | | | | |
|---|---|---|---|---|
| Crosslinking temperature (° C.) | 170 | 170 | 170 | 170 |
| ML (kgf*cm) | 0.2 | 0.1 | 0.4 | 0.3 |
| MH (kgf*cm) | 4.4 | 3.1 | 5.4 | 5.5 |
| Crosslinking rate $T_{10}$ (min) | 4.0 | 4.8 | 7.6 | 3.6 |
| Crosslinking rate $T_{90}$ (min) | 5.8 | 6.3 | 11.7 | 5.2 |
| Physical properties in normal state | | | | |
| Tensile stress $M_{100}$ (MPa) | 8.8 | 8.4 | 9.6 | 9.2 |
| TB (Tensile strength) (MPa) | 13.1 | 12.1 | 14.6 | 12.9 |
| EB (Elongation) (%) | 162 | 148 | 157 | 149 |
| Hardness Peak | 85 | 87 | 84 | 86 |
| Hardness 3 seconds after | 82 | 82 | 80 | 83 |
| Compression set (200° C. × 70 hr) | 18 | 18 | 16 | 19 |

From the results of Examples shown in Table 5, it is seen that the tensile strength of the crosslinked fluorine-containing elastomer compositions comprising the fluorine-containing elastomers (A) and (B) satisfying the requirements of the present invention is improved as compared with the tensile strength of the fluorine-containing elastomers of Comparative Examples having the same viscosity as that of the composition of the present invention.

Example 7

(Preparation of White Fluorine-Containing Elastomer Composition for Crosslinking)

The dispersion of fluorine-containing elastomer (A-3) prepared in Preparation Example 3 and the dispersion of fluorine-containing elastomer (B-3) prepared in Preparation Example 9 were blended in a weight ratio of solid content of 85/15, and thereto was added a 27% by mass aqueous solution of aluminum sulfate to carry out co-coagulation. The obtained co-coagulated product was washed with water and dried to obtain 450 g of a fluorine-containing elastomer composition. Mooney viscosity ($ML_{1+10}$: 121° C.) of this composition was 31.

In a 0.3 liter kneader, 100 parts by mass of this fluorine-containing elastomer composition, 2.17 parts by mass of bisphenol AF and 0.43 part by mass of benzyltriphenylphosphonium chloride (BTPPC) were kneaded for 12 minutes while controlling the kneader temperature so that a temperature of the mixture was kept at 140° to 150° C., to obtain a pre-mixture. Further, in a 0.3 L kneader, to 100 parts by mass of the fluorine-containing elastomer composition were added 3 parts by mass of magnesium oxide (MA-150), 6 parts by mass of calcium hydroxide (Caldic 2000), 15 parts by mass of calcium silicate (NYAD 400) and 1 part by mass of carnauba wax, and the mixture was kneaded for 180 seconds while controlling the kneader temperature so that a temperature of the mixture was kept at 70° to 100° C., to obtain a fluorine-containing elastomer composition for crosslinking. Mooney viscosity ($ML_{1+10}$: 121° C.) of the obtained composition for crosslinking was 38. Crosslinking characteristics of this composition for crosslinking and physical properties of a crosslinked article obtained by press-crosslinking and then oven-crosslinking of the composition are shown in Table 6.

Examples 8 to 11

(Preparation of White Fluorine-Containing Elastomer Composition for Crosslinking)

Fluorine-containing elastomer compositions were prepared by co-coagulation in the same manner as in Example 7 except that the fluorine-containing elastomers shown in Table 6 were used as the fluorine-containing elastomer (A) and the fluorine-containing elastomer (B) in the proportions shown in Table 6, and pre-mixtures and fluorine-containing elastomer compositions for crosslinking were prepared in the same manner as in Example 7.

Mooney viscosities ($ML_{1+10}$: 121° C.) of the fluorine-containing elastomer compositions prepared by co-coagulation and the compositions for crosslinking, crosslinking characteristics of the compositions for crosslinking and further, physical properties of crosslinked article obtained by press-crosslinking and then oven-crosslinking of these compositions are shown in Table 6.

Comparative Example 5

Only the fluorine-containing elastomer (A-6) prepared in Preparation Example 6 and satisfying the conditions (A) of the present invention was coagulated by adding a 27% by mass aqueous solution of aluminum sulfate thereto without co-coagulation with the fluorine-containing elastomer (B). A fluorine-containing elastomer composition for crosslinking was prepared in the same manner as in Example 7 except that the obtained coagulated product was washed with water and dried. Mooney viscosity ($ML_{1+10}$: 121° C.) of the obtained fluorine-containing elastomer composition for crosslinking, crosslinking characteristics of the composition for crosslinking and further, physical properties of a crosslinked article obtained by press-crosslinking and then oven-crosslinking of the composition are shown in Table 6.

TABLE 6

| | Example | | | | | Com. Ex. |
|---|---|---|---|---|---|---|
| | 7 | 8 | 9 | 10 | 11 | 5 |
| Fluorine-containing elastomer (A) | | | | | | |
| Kind | Prep. Ex. 3 | Prep. Ex. 4 | Prep. Ex. 5 | Prep. Ex. 5 | Prep. Ex. 5 | Prep. Ex. 6 |
| Amount (part by mass) | 85 | 85 | 85 | 85 | 70 | 100 |

TABLE 6-continued

|  | Example | | | | | Com. Ex. |
|---|---|---|---|---|---|---|
|  | 7 | 8 | 9 | 10 | 11 | 5 |
| Fluorine-containing elastomer (B) | | | | | | |
| Kind | Prep. Ex. 9 | Prep. Ex. 9 | Prep. Ex. 8 | Prep. Ex. 9 | Prep. Ex. 9 | — |
| Amount (part by mass) | 15 | 15 | 15 | 15 | 30 | — |
| Formulation | Standard formulation 2 | Standard formulation 2 | Standard formulation 2 | Standard formulation 2 | Standard formulation 2 | Standard formulation 2 |
| Mooney viscosity ($ML_{1+10}$: 121° C.) | | | | | | |
| Fluorine-containing elastomer composition | 31 | 48 | 35 | 41 | 72 | 42 |
| Fluorine-containing elastomer composition for crosslinking | 38 | 55 | 49 | 54 | 106 | 62 |
| Crosslinking characteristics | | | | | | |
| Crosslinking temperature (° C.) | 170 | 170 | 170 | 170 | 170 | 170 |
| ML (kgf*cm) | 0.1 | 0.2 | 0.2 | 0.2 | 0.2 | 0.1 |
| MH (kgf*cm) | 3.1 | 4.0 | 3.3 | 4.4 | 4.1 | 4.1 |
| Crosslinking rate $T_{10}$ (min) | 3.0 | 3.6 | 3.5 | 2.6 | 2.6 | 2.8 |
| Crosslinking rate $T_{90}$ (min) | 4.6 | 5.2 | 3.6 | 3.8 | 4.0 | 3.5 |
| Physical properties in normal state | | | | | | |
| Tensile stress $M_{100}$ (MPa) | 5.2 | 5.3 | 5.0 | 4.4 | 3.8 | 4.0 |
| TB (Tensile strength) (MPa) | 9.8 | 9.9 | 8.9 | 9.7 | 9.4 | 8.1 |
| EB (Elongation) (%) | 190 | 209 | 201 | 222 | 200 | 205 |
| Hardness Peak | 67 | 67 | 66 | 67 | 67 | 66 |
| Hardness 3 seconds after | 62 | 62 | 61 | 64 | 65 | 64 |
| Compression set (200° C. × 70 hr) | 16 | 12 | 14 | 14 | 17 | 13 |

From the results of Examples shown in Table 6, it is seen that the tensile strength of the crosslinked fluorine-containing elastomer compositions comprising the fluorine-containing elastomers (A) and (B) satisfying the requirements of the present invention is improved in a wide range of viscosity.

Example 12

(Preparation of Black Fluorine-Containing Elastomer Composition for Crosslinking by Sole Reactor Method)

A fluorine-containing elastomer composition was prepared by coagulation in the same manner as in Example 1 except that the fluorine-containing elastomer prepared in Preparation Example 12 was used as a fluorine-containing elastomer, and a pre-mixture and a fluorine-containing elastomer composition for crosslinking were prepared in the same manner as in Example 1. Mooney viscosities ($ML_{1+10}$: 121° C.) of the composition obtained by the coagulation and the composition for crosslinking, crosslinking characteristics of the composition for crosslinking and physical properties of a crosslinked article obtained by press-crosslinking and then oven-crosslinking of the composition are shown in Table 7.

TABLE 7

|  | Example 12 |
|---|---|
| Fluorine-containing elastomer | |
| Kind | Prep. Ex. 12 |
| Amount (part by mass) | 100 |
| Formulation | Standard formulation 1 |
| Mooney viscosity ($ML_{1+10}$: 121° C.) | |
| Fluorine-containing elastomer composition | 31 |
| Fluorine-containing elastomer composition for crosslinking | 59 |

TABLE 7-continued

|  | Example 12 |
|---|---|
| Crosslinking characteristics | |
| Crosslinking temperature (° C.) | 170 |
| ML (kgf*cm) | 0.2 |
| MH (kgf*cm) | 4.6 |
| Crosslinking rate $T_{10}$ (min) | 4.6 |
| Crosslinking rate $T_{90}$ (min) | 7.0 |
| Physical properties in normal state | |
| Tensile stress $M_{100}$ (MPa) | 9.3 |
| TB (Tensile strength) (MPa) | 14.4 |
| EB (Elongation) (%) | 174 |
| Hardness Peak | 81 |
| Hardness 3 seconds after | 77 |
| Compression set (200° C. × 70 hr) | 15 |

Generally, the higher a viscosity is, the more mechanical properties of a crosslinked article are improved. However, from the results shown in Table 7, it is seen that in spite of not so high viscosity as compared with Comparative Examples of Table 5, the tensile strength of the crosslinked composition is improved.

Example 13

(Fluorine-Containing Elastomer Composition for Crosslinking Comprising Bituminous Coal Carbon Black)

In a 0.3 L kneader, to 100 parts by mass of the fluorine-containing elastomer composition prepared in Example 10 by the co-coagulation and having Mooney viscosity ($ML_{1+10}$: 121° C.) of 41 were added 0.48 part by mass of bisphenol AF and 2.14 parts by mass of VITON CURATIVE No. 50, followed by kneading for 12 minutes while controlling the kneader temperature so that a temperature of the mixture was kept at 140° to 150° C., to obtain a pre-mixture. Further, in a 8 inch open roll, to 100 parts by mass of the fluorine-containing elastomer composition were added 6 parts by mass of magnesium oxide (MA-150), 15 parts by mass of carbon black N990 and 15 parts by mass of Mineral Black 325BA, and the mixture was kneaded to obtain a fluorine-containing elastomer composition for crosslinking. Crosslinking characteristics of this composition for crosslinking, physical properties and compression set (measurement was carried out using a sample subjected to holding at 280° C. for 50 hours under 25% compression and then allowing to stand in a thermostatic chamber of 25° C. for 30 minutes) of a crosslinked article obtained by press-crosslinking at 180° C. for 10 minutes and further oven-crosslinking at 260° C. for six hours and then at 300° C. for 1.5 hours are shown in Table 8.

Comparative Example 6

Only the fluorine-containing elastomer (A-6) prepared in Preparation Example 6 and satisfying the conditions of (A) of the present invention was coagulated by adding a 27% by mass aqueous solution of aluminum sulfate thereto without co-coagulation with the fluorine-containing elastomer (B). A fluorine-containing elastomer composition for crosslinking was prepared in the same manner as in Example 13 except that the obtained coagulated product was washed with water and dried. Crosslinking characteristics of this fluorine-containing elastomer composition for crosslinking, physical properties and compression set (measurement was carried out using a sample subjected to holding at 280° C. for 50 hours under 25% compression and then allowing to stand in a thermostatic chamber of 25° C. for 30 minutes) of a crosslinked article obtained by press-crosslinking at 180° C. for 10 minutes and further oven-crosslinking at 260° C. for six hours and then at 300° C. for 1.5 hours are shown in Table 8.

TABLE 8

|  | Example 13 | Com. Ex. 6 |
|---|---|---|
| Fluorine-containing elastomer (A) | | |
| Kind | Prep. Ex. 5 | Prep. Ex. 6 |
| Amount (part by mass) | 85 | 100 |
| Fluorine-containing elastomer (B) | | |
| Kind | Prep. Ex. 9 | — |
| Amount (part by mass) | 15 | — |
| Formulation | Standard formulation 3 | Standard formulation 3 |
| Mooney viscosity ($ML_{1+10}$: 121° C.) | | |
| Fluorine-containing elastomer composition | 41 | 42 |
| Crosslinking characteristics | | |
| Crosslinking temperature (° C.) | 180 | 180 |
| ML (kgf*cm) | 0.3 | 0.3 |
| MH (kgf*cm) | 4.3 | 4.5 |
| Crosslinking rate $T_{10}$ (min) | 1.4 | 1.4 |
| Crosslinking rate $T_{90}$ (min) | 2.4 | 2.4 |

TABLE 8-continued

|  | Example 13 | Com. Ex. 6 |
|---|---|---|
| Physical properties in normal state | | |
| Tensile stress $M_{100}$ (MPa) | 6.1 | 6.3 |
| TB (Tensile strength) (MPa) | 13.4 | 12.9 |
| EB (Elongation) (%) | 185 | 185 |
| Hardness Peak | 74 | 75 |
| Hardness 3 seconds after | 70 | 71 |
| Compression set (280° C. × 50 hr) | 38 | 44 |

Examples 14 and 15

Fluorine-containing elastomer compositions were prepared by co-coagulation in the same manner as in Example 3, where the polymer of Preparation Example 3 prepared by polymerization using isopentane was used as the polymer (A), except that the standard formulation 1 was changed to the standard formulation 4 (20 parts by mass of carbon black, Example 14) and the standard formulation 1 was changed to the standard formulation 5 (45 parts by mass of carbon black, Example 15), and pre-mixtures and fluorine-containing elastomer compositions for crosslinking were prepared in the same manner as in Example 3.

Mooney viscosities ($ML_{1+10}$: 121° C.) of the compositions obtained by the co-coagulation and the compositions for crosslinking, crosslinking characteristics of the compositions for crosslinking and further, physical properties of crosslinked articles obtained by press-crosslinking and then oven-crosslinking of the compositions are shown in Table 9.

In Table 9, the results of Example 3 are also shown.

Comparative Examples 7 and 8

Fluorine-containing elastomer compositions were prepared in the same manner as in Comparative Example 4, where only the polymer of Preparation Example 6 prepared by the polymerization without using isopentane was used, except that the standard formulation 1 was changed to the standard formulation 4 (20 parts by mass of carbon black, Comparative Example 7) and the standard formulation 1 was changed to the standard formulation 5 (45 parts by mass of carbon black, Comparative Example 8), and pre-mixtures and fluorine-containing elastomer compositions for crosslinking were prepared in the same manner as in Comparative Example 4.

Mooney viscosities ($ML_{1+10}$: 121° C.) of the obtained fluorine-containing elastomer compositions and the compositions for crosslinking, crosslinking characteristics of the compositions for crosslinking and further, physical properties of crosslinked articles obtained by press-crosslinking and then oven-crosslinking of the compositions are shown in Table 9.

In Table 9, the results of Comparative Example 4 are also shown.

TABLE 9

|  | Example | | | Com. Ex. | | |
|---|---|---|---|---|---|---|
|  | 14 | 3 | 15 | 7 | 4 | 8 |
| Fluorine-containing elastomer (A) | | | | | | |
| Kind | Prep. Ex. 3 | Prep. Ex. 3 | Prep. Ex. 3 | Prep. Ex. 6 | Prep. Ex. 6 | Prep. Ex. 6 |
| Amount (part by mass) | 85 | 85 | 85 | 100 | 100 | 100 |

TABLE 9-continued

|  | Example | | | Com. Ex. | | |
| --- | --- | --- | --- | --- | --- | --- |
|  | 14 | 3 | 15 | 7 | 4 | 8 |
| Fluorine-containing elastomer (B) | | | | | | |
| Kind | Prep. Ex. 9 | Prep. Ex. 9 | Prep. Ex. 9 | — | — | — |
| Amount (part by mass) | 15 | 15 | 15 | — | — | — |
| Carbon black (part by mass) | 20 | 35 | 45 | 20 | 35 | 45 |
| Formulation | Standard formulation 4 | Standard formulation 1 | Standard formulation 5 | Standard formulation 4 | Standard formulation 1 | Standard formulation 5 |
| Mooney viscosity ($ML_{1+10}$: 121° C.) | | | | | | |
| Fluorine-containing elastomer composition | 31 | 31 | 31 | 42 | 42 | 42 |
| Fluorine-containing elastomer composition for crosslinking | 51 | 59 | 74 | 69 | 82 | 93 |
| Crosslinking characteristics | | | | | | |
| Crosslinking temperature (° C.) | 170 | 170 | 170 | 170 | 170 | 170 |
| ML (kgf*cm) | 0.2 | 0.3 | 0.4 | 0.2 | 0.3 | 0.3 |
| MH (kgf*cm) | 3.5 | 5.8 | 5.5 | 3.9 | 5.5 | 5.7 |
| Crosslinking rate $T_{10}$ (min) | 2.6 | 3.8 | 3.0 | 2.8 | 3.6 | 2.6 |
| Crosslinking rate $T_{90}$ (min) | 3.9 | 5.9 | 4.7 | 4.2 | 5.2 | 4.0 |
| Physical properties in normal state | | | | | | |
| Tensile stress $M_{100}$ (MPa) | 5.8 | 9.9 | 12.8 | 5.7 | 9.2 | 11.6 |
| TB (Tensile strength) (MPa) | 14.3 | 15.9 | 16.5 | 13.5 | 12.9 | 14.9 |
| EB (Elongation) (%) | 210 | 160 | 130 | 210 | 149 | 130 |
| Hardness Peak | 71 | 82 | 87 | 74 | 86 | 90 |
| Hardness 3 seconds after | 68 | 78 | 83 | 69 | 83 | 87 |
| Compression set (200° C. × 70 hr) | 14 | 15 | 16 | 16 | 19 | 22 |

From Table 9, it is seen that in the case of using a polymer obtained by polymerization using isopentane, even if a large amount of carbon black is blended, deterioration of compression set is small. Also, when comparing Example 15 and Comparative Example 4, where hardness is the same, the amount of carbon black can be increased by as large as 10 parts by mass. Further, it is seen that though carbon black is blended in an amount larger by 10 parts by mass, compression set is good.

The invention claimed is:

1. A fluorine-containing elastomer composition comprising:
   (A) an elastomer which is a vinylidene fluoride/hexafluoropropylene copolymer having a branching coefficient of 30 to 300 ppm, a Mooney viscosity ($ML_{1+10}$: 121° C.) of 7 to 80 and a molecular weight distribution (Mw/Mn) of 1.5 to 4, and
   (B) an elastomer which is a vinylidene fluoride/hexafluoropropylene copolymer having a storage modulus G' at 180° C. at 500 cpm of 500 to 900,
   in which a mass ratio of (A)/(B) is 70/30 to 90/10.

2. The fluorine-containing elastomer composition of claim 1, having a Mooney viscosity ($ML_{1+10}$: 121° C.) of 10 to 100.

3. The fluorine-containing elastomer composition of claim 1, wherein the elastomer (A) has a carboxyl group and an acid value of from 0.5 to 1.0 mg KOH/g.

4. The fluorine-containing elastomer composition of claim 1, wherein the elastomer (A) is obtained by using isoparaffin as a chain transfer agent.

5. The fluorine-containing elastomer composition of claim 1, comprising a filler.

6. A fluorine-containing elastomer composition for crosslinking comprising the fluorine-containing elastomer composition of claim 1 and a crosslinking agent.

7. A crosslinked article of a fluorine-containing elastomer obtained by subjecting the fluorine-containing elastomer composition for crosslinking of claim 6 to crosslinking.

* * * * *